(12) United States Patent
Zelazoski

(10) Patent No.: US 8,046,891 B1
(45) Date of Patent: Nov. 1, 2011

(54) METHOD OF MAKING A PLURALITY OF POCKET PLUGS

(76) Inventor: Brandon J. Zelazoski, Antigo, WI (US)

( * ) Notice: Subject to any disclaimer, the term of this patent is extended or adjusted under 35 U.S.C. 154(b) by 1054 days.

(21) Appl. No.: 11/871,450

(22) Filed: Oct. 12, 2007

Related U.S. Application Data

(60) Provisional application No. 60/881,662, filed on Jan. 22, 2007.

(51) Int. Cl.
*B23P 17/00* (2006.01)
*F16B 13/06* (2006.01)

(52) U.S. Cl. .......... 29/417; 29/412; 29/414; 29/415; 29/558; 411/57.1; 411/59; 411/21; 411/22

(58) Field of Classification Search .......... 29/412, 29/414, 415, 417, 557, 558; 411/21, 22, 411/30, 57.1, 59
See application file for complete search history.

(56) References Cited

U.S. PATENT DOCUMENTS

| | | | | |
|---|---|---|---|---|
| 1,323,555 A | * | 12/1919 | Smith | 29/412 |
| 4,010,949 A | * | 3/1977 | Lee | 473/7 |
| 4,114,876 A | * | 9/1978 | Maruszak | 273/108.21 |
| 4,434,416 A | * | 2/1984 | Schonberger | 338/22 R |
| 4,603,719 A | | 8/1986 | Durney | |
| 4,944,627 A | * | 7/1990 | Durney | 403/8 |
| 5,529,428 A | * | 6/1996 | Bischof | 403/408.1 |
| 5,593,089 A | * | 1/1997 | Coomer et al. | 238/370 |
| 5,997,229 A | | 12/1999 | Akers | |
| 6,267,527 B1 | | 7/2001 | Miller | |
| D456,700 S | | 5/2002 | Miller et al. | |
| D484,781 S | | 1/2004 | Miller | |
| 6,877,536 B2 | * | 4/2005 | Durney | 144/365 |
| D597,161 S | * | 7/2009 | Blair et al. | D21/783 |
| D597,162 S | * | 7/2009 | Blair et al. | D21/783 |
| 7,716,836 B2 | * | 5/2010 | Bischof et al. | 29/898.057 |

OTHER PUBLICATIONS

"Solid Wood Pocket Hole Plugs", Kreg Tool Company, Huxley, Iowa, 1 page (© 2005).
"Plastic Caps", Kreg Tool Company, Huxley, Iowa, 1 page (© 2005).
"Products—Design Features of Miller Dowels", Miller Dowel Company, Northfield, Illinois, 1 page (© 2006).
"Dowel Species", Miller Dowel Company, Northfield, Illinois, 1 page (© 2006).

* cited by examiner

*Primary Examiner* — Essama Omgba
(74) *Attorney, Agent, or Firm* — IPLM Group, P.A.

(57) ABSTRACT

A pocket plug is made by making a first angled cut and a second angled cut relative to proximate a first line and a first side of an elongate member having a length. A plurality of pocket plugs are made by repeating the first angled cut and the second angled cut a distance apart from the previous second angled cut along the length of the elongate member. Thus, by alternating between the first angled cut and the second angled cut the distance along the length of the elongate member, the plurality of pocket plugs are made.

10 Claims, 5 Drawing Sheets

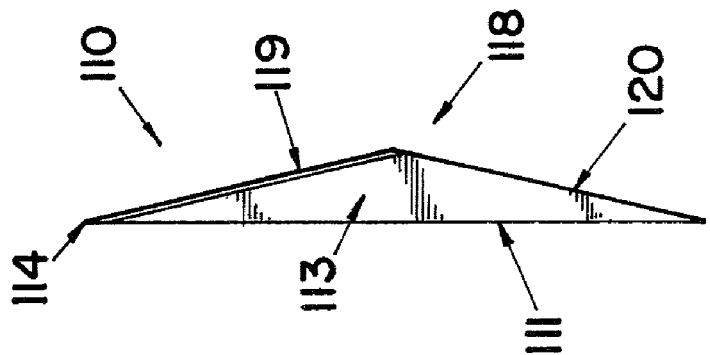
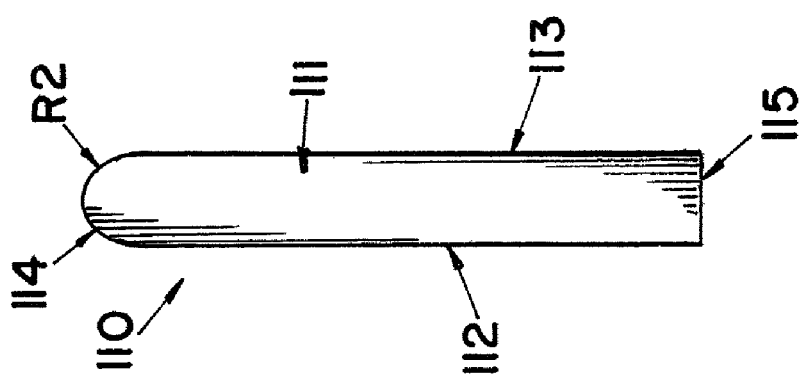
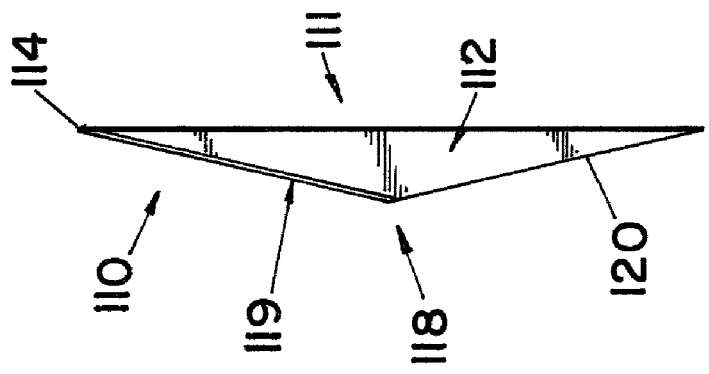

US 8,046,891 B1

METHOD OF MAKING A PLURALITY OF POCKET PLUGS

This application claims the benefit of U.S. Provisional Application Ser. No. 60/881,662, filed Jan. 22, 2007, which is hereby incorporated by reference herein.

FIELD OF THE INVENTION

The present invention relates to a pocket plug and a method of making a pocket plug.

BACKGROUND OF THE INVENTION

There are many applications, such as woodworking, in which two members must be secured together by fasteners in such a way that the fasteners are not exposed proximate the exterior surfaces of the resulting structure. Bores in which the fasteners are inserted, commonly referred to as pocket holes or mortises, are commonly used so that the fasteners do not extend outward proximate the exterior surfaces. U.S. Pat. No. 4,603,719, which is hereby incorporated by reference herein, discloses a method and an apparatus for forming a counterbore and a fastener receiving bore in a workpiece for toe-fastening the workpiece to a second workpiece. To conceal the fasteners, wood putty is commonly used. A screw cover such as that disclosed in U.S. Pat. No. 5,997,229 is also commonly used. These devices may not be aesthetically pleasing and it may be difficult to blend these devices with the finish applied to the resulting structure.

The present invention addresses the problems associated with the prior art devices and provides for a pocket plug and a method of making a pocket plug.

SUMMARY OF THE INVENTION

A pocket plug is made from an elongate member having a top, a bottom, a first side, and a second side. The top and the bottom each have a width of approximately 0.575 to 0.675 inch, and the first and second sides interconnect the top and the bottom with the top and the bottom being approximately 0.325 to 0.425 inch apart from one another. The first and second sides each have a radius of approximately 0.510 to 0.610 inch and extend outward from the top and the bottom approximately 0.017 to 0.083 inch.

A first cut at approximately 113 to 115 degrees and a second cut at approximately 103 to 105 degrees are made relative to proximate a first line perpendicular to the longitudinal axis of the elongate member and the first side of the elongate member. These first and second cuts result in a first pocket plug. Approximately 1.450 to 1.550 inch from proximate the first line and the second cut, a third cut at approximately 113 to 115 degrees is made relative to proximate a second line and the first side of the elongate member. This third cut results in a second pocket plug. A fourth cut at approximately 103 to 105 degrees is made relative to proximate the second line and the first side of the elongate member. This fourth cut results in a third pocket plug.

The pocket plug includes a first side surface and a second side surface interconnecting a top and a bottom. The bottom includes a first bottom surface and a second bottom surface. The top, the first bottom surface, and the second bottom surface form a triangular shape. A first end is proximate a first juncture of the top and the first bottom surface, and a second end is proximate a second juncture of the top and the second bottom surface. The first end is radiused proximate the first juncture.

The pocket plug is generally triangular in shape and has dimensions of approximately 2.450 to 2.550 inches long, approximately 0.320 to 0.420 inch wide, and approximately 0.220 to 0.320 inch high. The top of the triangle is approximately 2.450 to 2.550 inches long. The first and second bottom surfaces are at a 10 to 12 degree angle from the top and are each approximately 1.200 to 1.420 inches long. The juncture of the top surface and the first bottom surface form a first end having a radius of approximately 0.325 to 0.425 inch, which corresponds with the radius of the rounded end of a pocket mortise.

The pocket plug is configured and arranged to fit within a pocket mortise formed using the method disclosed in U.S. Pat. No. 4,603,719 and to accommodate a fastener within the pocket mortise to conceal the fastener and the pocket mortise.

BRIEF DESCRIPTION OF THE DRAWINGS

FIG. 4 is a top view of a pocket plug constructed according to the principles of the present invention made from the molding shown in FIG. 1;

FIG. 5 is a left side view of the pocket plug shown in FIG. 4;

FIG. 6 is a right side view of the pocket plug shown in FIG. 4;

DETAILED DESCRIPTION OF A PREFERRED EMBODIMENT

Figure 1:
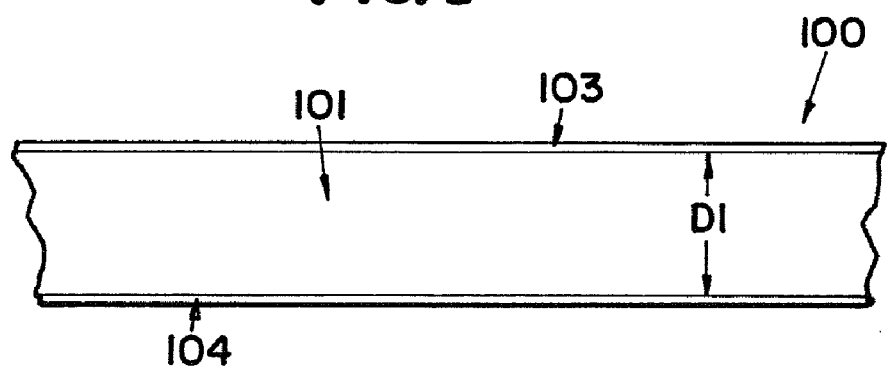
FIG. 1 is a top view of a portion of a molding constructed according to the principles of the present invention.

A pocket plug constructed according to the principles of the present invention is designated by the numeral 110 in the drawings.

Figure 2:
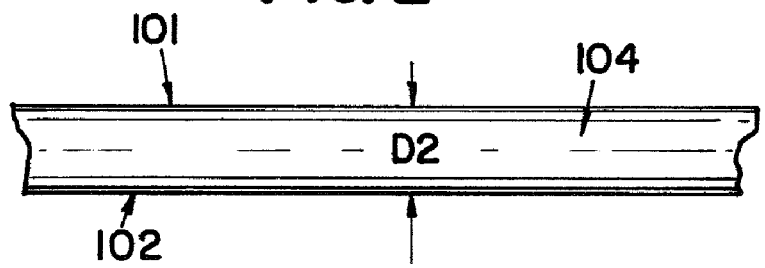
FIG. 2 is a side view of the portion of the molding shown in FIG. 1.
Figure 3:
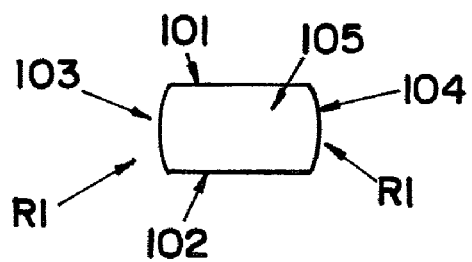
FIG. 3 is an end view of the molding shown in FIG. 1.

A plurality of pocket plugs 110 are preferably made by cutting a piece of molding 100. The molding 100 is an elongate member including a top 101, a bottom 102, a first side 103, a second side 104, and ends 105. The top 101 and the bottom 102 each have a width D1 of approximately 0.575 to 0.675 inch, and the sides 103 and 104 interconnect the top 101 and the bottom 102 with the top 101 and the bottom 102 a distance D2 of approximately 0.325 to 0.425 inch apart from one another. This is shown in FIGS. 1 and 2. The sides 103 and 104 each have a radius R1 of approximately 0.510 to 0.610 inch and extend outward from the top 101 and the bottom 102 approximately 0.017 to 0.083 inch. This is shown in FIGS. 1 and 3.

The molding 100 may be manufactured by sawing wood into elongate strips approximately 0.770 to 0.870 inch by 0.400 to 0.500 inch. Although wood is preferably used, it is recognized that any other suitable material may be used. The strips are then milled using a molder such as a SCMI Compact 23 manufactured by SCM International S.p.A. of Rimini, Italy to produce a profile having two flat sides (the top 101 and the bottom 102) and a 0.510 to 0.610 inch radius on both edges (sides 103 and 104). The dimensions of the molded strip are now 0.650 to 0.750 inch (from the side 103 to the side 104) by 0.325 to 0.425 inch.

Figure 7:
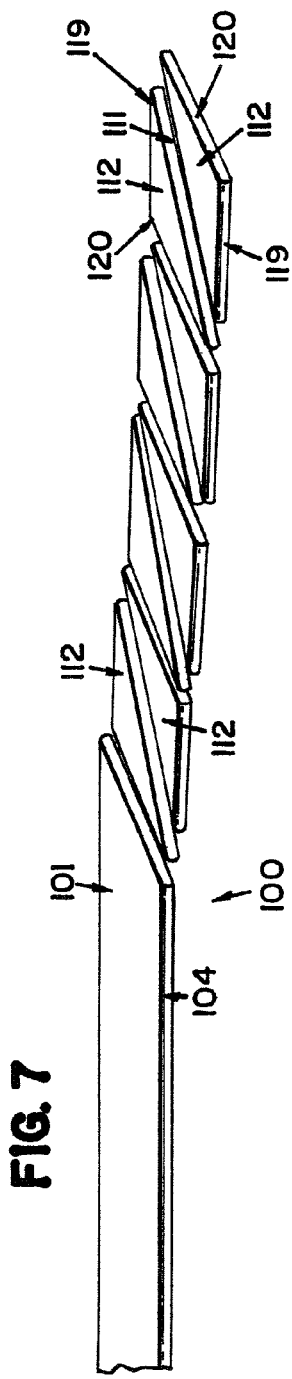
FIG. 7 is a top perspective view of a molding and a plurality of pocket plugs made from the molding constructed according to the principles of the present invention.

Although any suitable equipment may be used, an Omga Model T55300 machine manufactured by Omga S.p.A. of Limidi Di Soliera (MO), Italy was modified to make cuts at angles of approximately 103 to 105 degrees and approximately 113 to 115 degrees relative to a first line perpendicular to the longitudinal axis of the molding 100. A twelve inch saw blade having a saw kerf of approximately ⅛ inch was used. Making cuts alternating between these two angles along the length of the molding 100 produces a plurality of pocket plugs 110 as shown in FIG. 7.

Figure 10:
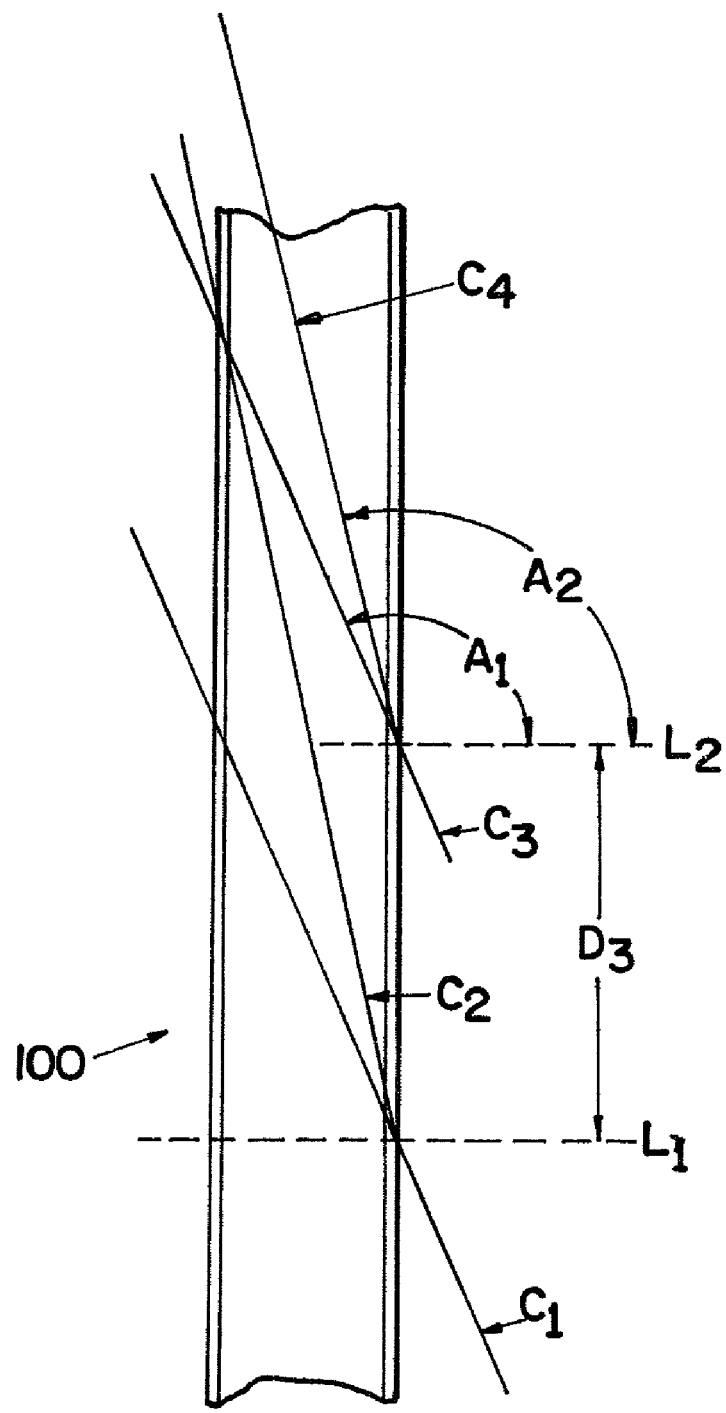
FIG. 10 is a schematic view showing a top view of a portion of a molding constructed according to principles of the present invention with lines showing the angles at which the molding is cut to make a plurality of pocket plugs.

More specifically, the cuts are shown in FIG. 10, which does not account for any saw kerf and therefore may not be to scale. Therefore, FIG. 10 is for illustrative purposes only and may vary depending upon any saw kerf. A first cut $C_1$ at approximately 113 to 115 degrees and a second cut $C_2$ at approximately 103 to 105 degrees are made relative to a first line $L_1$ and from right to left of the molding 100 in the orientation shown in FIG. 10. These cuts result in one pocket plug. Approximately 1.450 to 1.550 inch from the first and second cuts $C_1$ and $C_2$, a third cut $C_3$ at approximately 113 to 115 degrees (angle $A_1$) and a fourth cut $C_4$ at approximately 103 to 105 degrees (angle $A_2$) are made relative to a second line $L_2$ and from right to left of the molding 100. These cuts result in two additional pocket plugs. The first and second lines $L_1$ and $L_2$ are perpendicular to the longitudinal axis of the molding 100. The order in which these cuts are made is not important as long as they are alternating cuts between approximately 113 to 115 degrees and approximately 103 to 105 degrees the distances specified. These and additional alternating cuts may be made along the entire length of the molding 100 to make a plurality of pocket plugs 110. Two alternating cuts are needed to make the first pocket plug 110, and successive pocket plugs 110 are made by making an alternating cut. In other words, three alternating cuts result in two pocket plugs, four alternating cuts result in three pocket plugs, five alternating cuts result in four pocket plugs, and so on.

Each pocket plug 110 includes a first side 112 and a second side 113 interconnecting a top 111 and a bottom 118. The bottom 118 includes a first surface 119 and a second surface 120. The top 111, the first surface 119, and the second surface 120 form a triangular shape. The first and second sides 112 and 113 are therefore also triangular-shaped. The juncture of the top 111 and the first surface 119 is proximate a first end 114, and the juncture of the top 111 and the second surface 120 is proximate a second end 115. The first end 114 is preferably radiused proximate the juncture.

When the molding 100 is cut as described above, the first surface 119 is either the first side 103 or the second side 104 of the molding 100. The top 111 is made by making the cut at approximately 113 to 115 degrees, and the second surface 120 is made by making the cut at approximately 103 to 105 degrees. Because the first surface 119 is a radiused side 103 or 104 of the molding, the juncture of the top 111 and the first surface 119 proximate the first end 114 is also radiused. Thus, the radius of the sides 103 and 104 corresponds with the radius of the rounded end of the pocket mortise 201.

The resulting plurality of pocket plugs 110 preferably have dimensions of approximately 2.450 to 2.550 inches long, approximately 0.320 to 0.420 inch wide, and approximately 0.220 to 0.320 inch high. The plugs 110 are generally triangular in shape with one end (end 114) having a slight radius (0.325 to 0.425 inch). The long side of the triangle (top 111) is approximately 2.450 to 2.550 inches long. The two short sides (surfaces 119 and 120) are at a 10 to 12 degree angle from the long side (top 111) and are approximately 1.200 to 1.420 inches long. The juncture of the top 111 and the surface 119 (end 114) of each pocket plug 110 has a radius R2 of approximately 0.325 to 0.425 inch, which corresponds with the radius of the rounded end of the pocket mortise 201.

Figure 8:
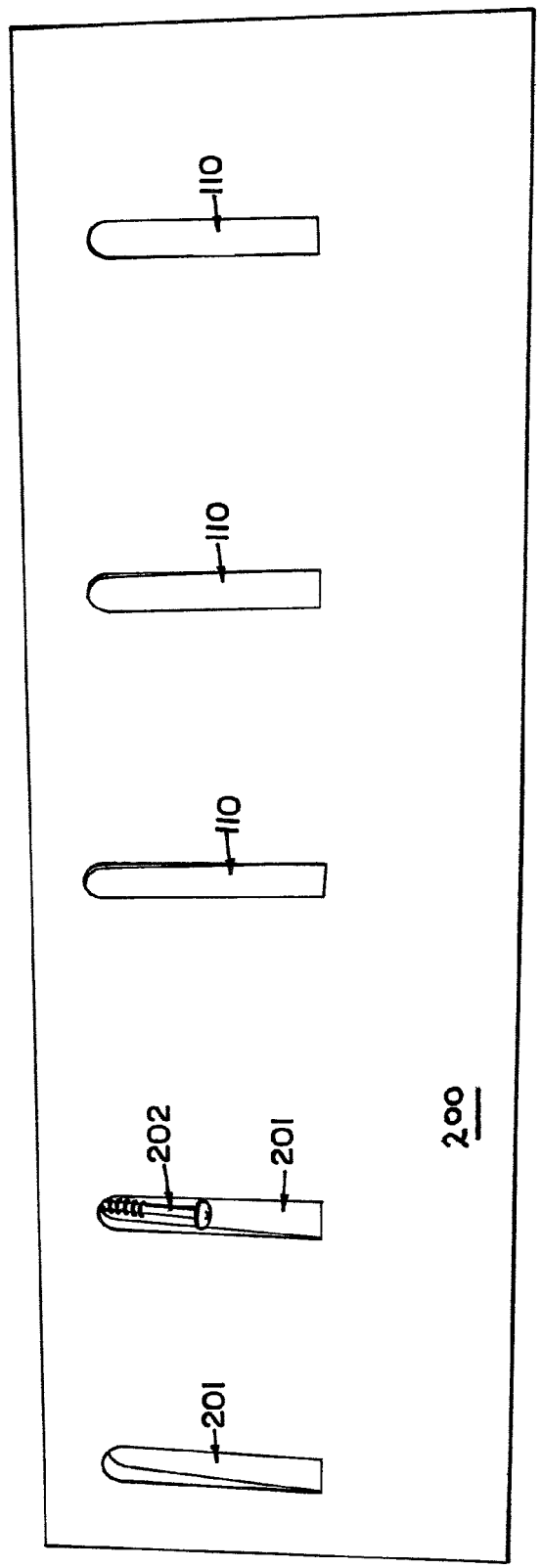
FIG. 8 is a top perspective view of a structure including a plurality of pocket mortises showing step by step how a fastener is inserted into the pocket mortise and then concealed using a pocket plug.
Figure 9:
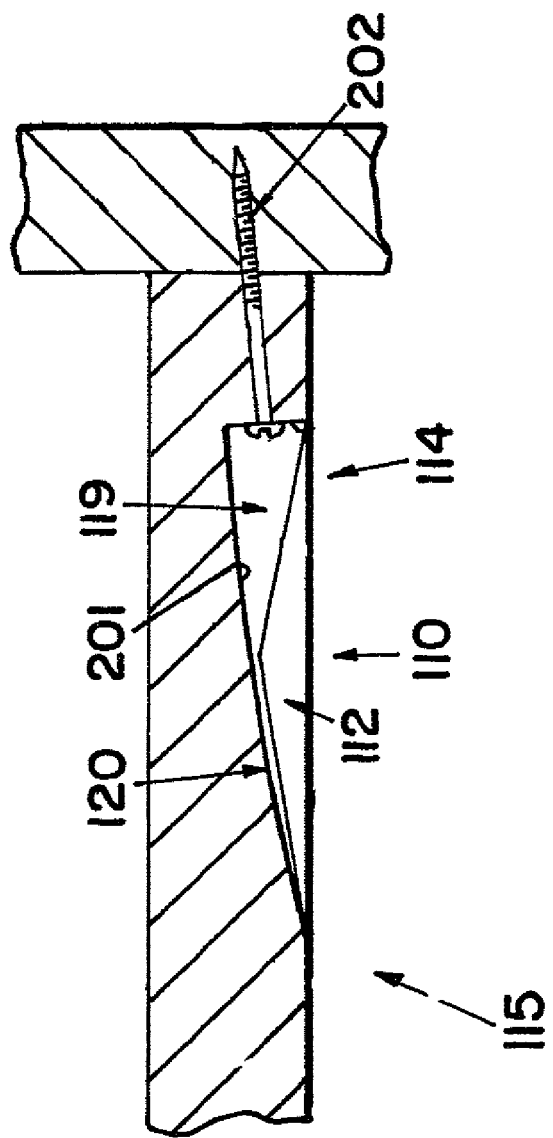
FIG. 9 is a side elevation view in cross-section of a first structure including a pocket mortise secured to a second structure with a fastener and a pocket plug concealing the fastener and the pocket mortise.

The pocket plugs 110 are configured and arranged to fit within pocket mortises 201 formed using the method disclosed in U.S. Pat. No. 4,603,719. FIG. 8 shows a structure 200 with a plurality of pocket mortises 201 and shows step by step how a fastener 202 is inserted into the pocket mortise 201 and then concealed using a pocket plug 110. Once the fastener 202 has been secured within the pocket mortise 201, a pocket plug 110 is inserted into the pocket mortise 201 with the bottom 118 going into the mortise and the top 111 facing away from the mortise with the first end 114 proximate the rounded end of the mortise and the second end 115 proximate the more shallow portion of the mortise. The plug 110 is tapped into the mortise 201 and is friction-fit therein. Optionally, an adhesive such as glue may be used to more permanently secure the plug 110 to the structure 200. The portion of the pocket plug 110 proximate the top 111 may extend outward from the surface of the structure 200, and this portion may be sanded down to be flush with the surface of the structure 200. The first bottom surface 119 is angled to accommodate the head of the fastener 202, and the second bottom surface 120 is angled to correspond with the angle of the mortise 201. This is shown in FIG. 9, which shows a pocket mortise made by the method disclosed in U.S. Pat. No. 4,603,719, which is hereby incorporated by reference herein.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of making a plurality of pocket plugs from an elongate member, the elongate member having a top, a bottom, a first side, and a second side, the top and the bottom each having a width of approximately 0.575 to 0.675 inch, the first side and the second side interconnecting the top and the bottom approximately 0.325 to 0.425 inch apart, the first side and the second side each having a radius of approximately 0.510 to 0.610 inch and extending outward from the top and the bottom approximately 0.017 to 0.083 inch, the elongate member having a first line perpendicular to a longitudinal axis of the elongate member, comprising:

making a first cut at approximately 113 to 115 degrees and a second cut at approximately 103 to 105 degrees relative to proximate the first line and the first side of the elongate member, the first and second cuts resulting in a first pocket plug;

measuring approximately 1.450 to 1.550 inches from proximate the first line and the second cut to determine a second line perpendicular to the longitudinal axis of the elongate member;

making a third cut at approximately 113 to 115 degrees relative to proximate the second line and the first side of the elongate member, the third cut resulting in a second pocket plug; and making a fourth cut at approximately 103 to 105 degrees relative to proximate the second line proximate the first side of the elongate member, the fourth cut resulting in a third pocket plug.

2. The method of claim 1, wherein each of the pocket plugs has dimensions of approximately 2.450 to 2.550 inches long, approximately 0.320 to 0.420 inch wide, and approximately 0.220 to 0.320 inch high.

3. The method of claim 1, wherein each of the pocket plugs includes a first side surface and a second side surface interconnecting a top and a bottom, the bottom including a first bottom surface and a second bottom surface, the top, the first bottom surface, and the second bottom surface forming a triangular shape, a first end being proximate a first juncture of the top and the first bottom surface, a second end being proximate a second juncture of the top and the second bottom surface, the first end being radiused proximate the first juncture.

4. The method of claim 3, wherein the first end is radiused approximately 0.325 to 0.425 inch.

5. The method of claim 3, wherein the first bottom surface and the second bottom surface are each at a 10 to 12 degree angle from the top and are each approximately 1.200 to 1.420 inches long.

6. A method of making a plurality of pocket plugs, comprising:

cutting a material into an elongate strip having a height of approximately 0.400 to 0.500 inch and a width of approximately 0.770 to 0.870 inch;

milling the elongate strip into an elongate member, the elongate member having a top, a bottom, a first side, and a second side, the top and the bottom each having a width of approximately 0.575 to 0.675 inch, the first side and the second side interconnecting the top and the bottom approximately 0.325 to 0.425 inch apart, the first side and the second side each having a radius of approximately 0.510 to 0.610 inch and extending outward from the top and the bottom approximately 0.017 to 0.083 inch, the elongate member having a first line perpendicular to a longitudinal axis of the elongate member;

making a first cut at approximately 113 to 115 degrees and a second cut at approximately 103 to 105 degrees relative to proximate the first line and the first side of the elongate member, the first and second cuts resulting in a first pocket plug;

measuring approximately 1.450 to 1.550 inches from proximate the first line and the second cut to determine a second line perpendicular to the longitudinal axis of the elongate member;

making a third cut at approximately 113 to 115 degrees relative to proximate the second line and the first side of the elongate member, the third cut resulting in a second pocket plug; and making a fourth cut at approximately 103 to 105 degrees relative to proximate the second line proximate the first side of the elongate member, the fourth cut resulting in a third pocket plug.

7. The method of claim 6, wherein each of the pocket plugs has dimensions of approximately 2.450 to 2.550 inches long, approximately 0.320 to 0.420 inch wide, and approximately 0.220 to 0.320 inch high.

8. The method of claim 6, wherein each of the pocket plugs includes a first side surface and a second side surface interconnecting a top and a bottom, the bottom including a first bottom surface and a second bottom surface, the top, the first bottom surface, and the second bottom surface forming a triangular shape, a first end being proximate a first juncture of the top and the first bottom surface, a second end being proximate a second juncture of the top and the second bottom surface, the first end being radiused proximate the first juncture.

9. The method of claim 8, wherein the first end is radiused approximately 0.325 to 0.425 inch.

10. The method of claim 8, wherein the first bottom surface and the second bottom surface are each at a 10 to 12 degree angle from the top and are each approximately 1.200 to 1.420 inches long.

* * * * *